United States Patent
Dingli (12) 
(10) Patent No.: US 10,587,995 B1
(45) Date of Patent: Mar. 10, 2020

(54) IN-VEHICLE COMMUNICATION THROUGH MOBILE DEVICE

(71) Applicant: Pony AI Inc., Grand Cayman (KY)

(72) Inventor: Robert Dingli, Cupertino, CA (US)

(73) Assignee: Pony AI Inc., Grand Cayman (KY)

( * ) Notice: Subject to any disclaimer, the term of this patent is extended or adjusted under 35 U.S.C. 154(b) by 0 days.

(21) Appl. No.: 16/355,608

(22) Filed: Mar. 15, 2019

(51) Int. Cl.
*H04W 4/40* (2018.01)
*G05D 1/02* (2006.01)

(52) U.S. Cl.
CPC .............. *H04W 4/40* (2018.02); *G05D 1/021* (2013.01)

(58) Field of Classification Search
CPC .... G06F 21/35; H04L 2209/80; H04W 76/10; H04W 76/50; H04W 8/005; H04W 4/40; H04M 3/54; H04M 2250/02; H04M 3/4211; G05D 1/021
See application file for complete search history.

(56) References Cited

U.S. PATENT DOCUMENTS

| | | | |
|---|---|---|---|
| 9,229,623 B1 | 1/2016 | Penilla et al. | |
| 9,326,119 B2 | 4/2016 | Himmelstein | |
| 2009/0002147 A1* | 1/2009 | Bloebaum | H04M 1/6075 340/466 |
| 2013/0189963 A1* | 7/2013 | Epp | H04M 1/64 455/414.1 |
| 2014/0051379 A1* | 2/2014 | Ganesh | H04W 4/90 455/404.1 |
| 2014/0280928 A1* | 9/2014 | Heron | H04L 67/104 709/224 |
| 2016/0165031 A1* | 6/2016 | Gopinath | H04M 1/6091 455/569.2 |

* cited by examiner

*Primary Examiner* — Nizar N Sivji
(74) *Attorney, Agent, or Firm* — Sheppard Mullin Richter & Hampton LLP (57) ABSTRACT

Systems, methods, and non-transitory computer readable media may be configured to facilitate communication with a passenger of a vehicle. A communication event for a passenger inside a vehicle may be detected. Responsive to a detection of the communication event, communication with the passenger may be facilitated via a mobile device of the passenger.

17 Claims, 5 Drawing Sheets

IN-VEHICLE COMMUNICATION THROUGH MOBILE DEVICE

FIELD OF THE INVENTION

This disclosure relates to approaches for facilitating communication with a person inside a vehicle via a mobile device of the person.

BACKGROUND

Communication with a person within a vehicle may be desired. For example, a remote dispatcher, coordinator, and/or personnel may wish to speak with a passenger or a driver of a vehicle. A vehicle may not include communication equipment or the communication equipment of the vehicle may not be functioning properly. For example, a vehicle may not include a microphone or a microphone installed in the vehicle to enable communication with a person in the vehicle may not be functioning properly.

SUMMARY

Various embodiments of the present disclosure may include systems, methods, and non-transitory computer readable media configured to facilitate communication with a passenger of a vehicle. The vehicle may include an autonomous vehicle. A communication event for a passenger inside a vehicle may be detected. Responsive to a detection of the communication event, communication with the passenger may be facilitated via a mobile device of the passenger.

In some embodiments, facilitating communication with the passenger via the mobile device of the passenger may include providing an instruction to the passenger to enable one or more communication functionalities of the mobile device. The communication functionalit(ies) of the mobile device may include one or more of a microphone functionality, a button functionality a speaker functionality, and/or a display functionality. The instruction may instructs the passenger to run or switch to a communication application on the mobile device.

In some embodiments, facilitating communication with the passenger via the mobile device of the passenger may include controlling the mobile device to enable one or more communication functionalities of the mobile device.

In some embodiments, facilitating communication with the passenger via the mobile device of the passenger may include curtailing operation of one or more communication devices of the vehicle. The communication device(s) of the vehicle include one or more of a microphone, a speaker, and/or a display. For example, curtailing operation of the communication device(s) of the vehicle may include lowering or muting effect of at least one of the communication device(s) and/or turning off at least one of the communication device(s).

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

DETAILED DESCRIPTION

In various implementations, a communication event for a passenger inside a vehicle (e.g., autonomous vehicle, rideshare vehicle) may be detected. Responsive to a detection of the communication event, communication with the passenger may be facilitated via one or more mobile devices (e.g., smartphone, tablet, smartwatch) of the passenger. For example, a speaker of the vehicle may be used to audibly deliver information to the passenger while the microphone of a mobile device may be used to receive and transmit passenger responses. As another example, a display of the vehicle may be used to visually deliver information to the passenger while the button and/or touchscreen display of a mobile device may be used to receive and transmit passenger feedback.

Facilitating communication with the passenger via a mobile device of the passenger may include (1) providing one or more instructions to the passenger to enable one or more communication functionalities of the mobile device, and/or (2) controlling the mobile device to enable one or more communication functionalities of the mobile device. The instruction(s) may instruct the passenger to run or switch to a communication application on the mobile device. The communication application may enable and/or use the communication functionalities of the mobile device to receive and transmit passenger responses/feedback. The communication functionalit(ies) of the mobile device may include one or more of a microphone functionality, a button functionality, a speaker functionality, and/or a display functionality.

Facilitating communication with the passenger via a mobile device of the passenger may include curtailing operation of one or more communication devices of the vehicle. The communication device(s) of the vehicle include one or more of a microphone, a speaker, and/or a display. For example, curtailing operation of the communication device(s) of the vehicle may include lowering or muting effect of at least one of the communication device(s) and/or turning off at least one of the communication device(s). For instance, the microphone of the vehicle may be disabled, the speaker of the vehicle may be turned off or may have the volume lowered, and/or the display of the vehicle may be turned off or dimmed.

The approaches disclosed herein provides for use of a passenger's mobile device to communicate with the passenger. A mobile device carried by the passenger is likely to be a functioning mobile device. For example, a passenger of a ride-share vehicle be using a mobile device to call for the ride-share vehicle and/or check the status of a trip in the ride-share vehicle. The communication functionalities of the mobile device is likely functioning and the mobile device may be used to facilitate communication with the passenger.

While the disclosure is described herein with respect to facilitating communication with a passenger of a vehicle, this is merely for illustrative purposes and is not meant to be limiting. The approaches disclosed herein may be used to facilitating communication with other people that uses a vehicle or other people inside a vehicle, such as a driver of a vehicle.

Figure 1:
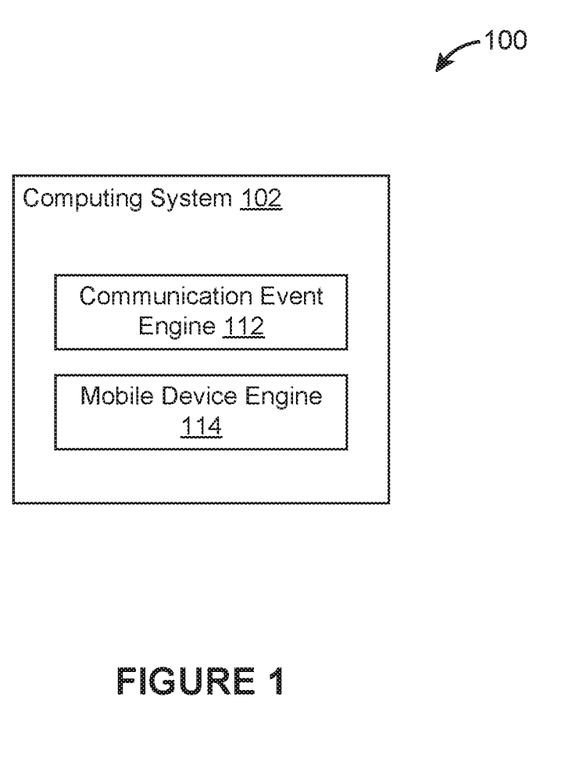
FIG. 1 illustrates an example environment for facilitating communication with a passenger of a vehicle, in accordance with various embodiments.

FIG. 1 illustrates an example environment 100 for facilitating communication with a passenger of a vehicle, in accordance with various embodiments. The example environment 100 may include a computing system 102. The computing system 102 may include one or more processors and memory. The processor(s) may be configured to perform various operations by interpreting machine-readable instructions stored in the memory. The environment 100 may also include one or more datastores that are accessible to the computing system 102 (e.g., stored in the memory of the computing system 102, coupled to the computing system, accessible via one or more network(s)). In some embodiments, the datastore(s) may include various databases, application functionalities, application/data packages, and/or other data that are available for download, installation, and/or execution.

In various embodiments, the computing system 102 may include a communication event engine 112, a mobile device engine 114, and/or other engines. While the computing system 102 is shown in FIG. 1 as a single entity, this is merely for ease of reference and is not meant to be limiting. One or more components/functionalities of the computing system 102 described herein may be implemented, in whole or in part, within a single computing device or within multiple computing devices. One or more portions of the computing system 102 may be implemented within a vehicle (e.g., autonomous vehicle). One or more portions of the computing system may be implemented remotely from a vehicle (e.g., server).

In various embodiments, the communication event engine 112 may be configured to detect a communication event for a passenger inside a vehicle. A vehicle may refer to a thing used to transport one or more persons and/or one or more things. Examples of vehicle may include an autonomous vehicle, a non-autonomous vehicle, a taxi, a ride-share vehicle, a vehicle owned by an organization, a personally owned vehicle, and/or other vehicles. A passenger may refer to a person who has started riding inside a vehicle, a person riding inside a vehicle, and/or a person who has finished riding inside a vehicle. The person may be carrying one or more mobile devices. A mobile device may refer to a portable computing device. Examples of mobile device may include a smartphone, a tablet, a smartwatch, a laptop, and/or other mobile devices.

A communication event may refer to an event that indicates desirability of communicating with the passenger of the vehicle. A communication event may refer to an event for which communication with the passenger of the vehicle is desired and/or an event that indicates that an event for which communication with the passenger is desirable is happening and/or will happen. A communication event may include an event in which the passenger of the vehicle wishes to communicate with a person outside the vehicle (e.g., a remote dispatcher, coordinator, and/or personnel), an event in which the passenger of the vehicle wishes to communicate with an intelligent system (e.g., vehicle artificial intelligence, remote artificial intelligence), an event in which a person outside the vehicle wishes to communicate with the passenger, and/or an event in which a an intelligent system wishes to communicate with the passenger. For example, a communication event for a passenger inside a vehicle may include one or more of the following events: a change in route being taken by the vehicle, the vehicle not following a planned route for a trip, a delay in a trip, another person getting into the vehicle, an accident on the road that affects the movement of the vehicle, an emergency situation inside the vehicle, a remote person/intelligent system indicating a desire/need to contact the passenger, a passenger indicting a desired/need to contact a remote person/intelligent system. Other communication events are contemplated.

The communication event engine 112 may be configured to detect a communication event based on information about the vehicle, information about the passenger, and/or other information. Information about the vehicle may include information about the status of the vehicle (e.g., mileage information, error codes), information about a trip being taken by the vehicle, information about a route being used by the vehicle, information about environment of the vehicle (e.g., weather condition, road condition, traffic conduction), information about activity inside the vehicle (e.g., optical analysis of the interior of the vehicle), and/or other vehicle information. Information about the passenger may include information about condition of the passenger, information about actions of the passenger, information about identity of the passenger, information about person(s) trying to reach the passenger, and/or other passenger information. The communication event engine 112 may analyze the information about the vehicle, information about the passenger, and/or other information to detect when one or more conditions indicating the occurrence of a communication event is present to detect a communication event.

The vehicle may not include communication equipment to facilitate communication with the passenger or the communication equipment of the vehicle may not be functioning properly. While a audio/audio-visual system of the vehicle (e.g., such as speakers, displays, entertainment system) may be used to convey information to the passenger, such system may not allow the passenger to respond to the conveyed information. For example, a speaker of the vehicle may be used by a remote person to "talk" to the passenger, the speaker may not include functionalities that allow the passenger's responses to be recorded and transmitted to the remote person. The vehicle may not include a microphone through which the passenger may speak or other interface device(s) (e.g., touchscreen display, buttons) through which the passenger may convey information/responses. As another example, an interface device (e.g., microphone, touchscreen display, buttons) in the vehicle may not be functioning properly. For instance, a microphone in the vehicle may be malfunctioning and not recording the passenger's voice. The remote person may not be able to determine whether the passenger is not speaking or whether the microphone is malfunctioning.

In various embodiments, the mobile device engine 114 may be configured to facilitate communication with the passenger via one or more mobile devices of the passenger. The communication may be facilitated via the mobile device(s) of the passenger response to a detection of the communication event. Facilitating the communication via a mobile device may include making the communication possible through the mobile device. Facilitating the communication via a mobile device may include making it easier to establish the communication possible through the mobile device. The communication with the passenger via a mobile device may include a two-way communication through the mobile device or a one-way communication through the mobile device.

In a two-way communication through a mobile device, information may be delivered to the passenger through one or more output functionalities of the mobile device and passenger response/feedback may be received and/or transmitted through one or more input functionalities of the mobile device. For example, the mobile device engine 114 may facilitate a two-way communication through the mobile device by using both input and output functionalities of the mobile device. Communication to the passenger may be conveyed through one or more output functionalities of the mobile device, such as a speaker of the mobile device and/or a display of the mobile device. For instance, the voice of the remote person may be played through a speaker of the mobile device and/or a visual message to the passenger may be presented on a display of the mobile device. Communication from the passenger may be conveyed through one or more input functionalities of the mobile device, such as a microphone of the mobile device, a button of the mobile device, and/or a touchscreen display of the mobile device. For instance, the voice of the passenger may be recorded by a microphone of the mobile device, a passenger response to communication from a remote person may be detected based on the passenger's interaction with one or more physical and/or one or more virtual buttons of the mobile device (e.g., the passenger pressing Volume Up and/or Volume Down to indicate a particular response to a question from the remote person), and/or a passenger response to communication from a remote person may be detected based on the passenger's interaction with a touchscreen display of the mobile device.

In a one-way communication through a mobile device, information may be delivered to the passenger through one or more output functionalities of the vehicle and passenger response/feedback may be received and/or transmitted through one or more input functionalities of the mobile device. For example, the mobile device engine 114 may facilitate a one-way communication through the mobile device by using input functionalities of the mobile device. Communication to the passenger may be conveyed through one or more output functionalities of the vehicle, such as a speaker of the vehicle and/or a display of the vehicle. For instance, the voice of the remote person may be played through a speaker of the vehicle and/or a visual message to the passenger may be presented on a display of the vehicle. Communication from the passenger may be conveyed through one or more input functionalities of the mobile device, such as a microphone of the mobile device, a button of the mobile device, and/or a touchscreen display of the mobile device. For instance, the voice of the passenger may be recorded by a microphone of the mobile device, a passenger response to communication from a remote person may be detected based on the passenger's interaction with one or more physical and/or one or more virtual buttons of the mobile device (e.g., the passenger pressing Volume Up and/or Volume Down to indicate a particular response to a question from the remote person), and/or a passenger response to communication from a remote person may be detected based on the passenger's interaction with a touchscreen display of the mobile device.

In some embodiments, the mobile device engine 114 may facilitate communication with the passenger via the mobile device of the passenger by providing one or more instructions to the passenger to enable one or more communication functionalities of the mobile device. A communication functionality of the mobile device may refer to capability of the mobile device to perform one or more operations/tasks to enable communication through the mobile device. The communication functionalit(ies) of the mobile device may include one or more input functionalities, such as a microphone functionality, a button (physical button, virtual button) functionality, and/or a display (touchscreen display) functionality, one or more output functionalities, such as a speaker functionality and/or a display functionality, and/or other communication functionalities.

In some embodiments, the instruction(s) to the passenger may instruct the passenger to run or switch to a communication application on the mobile device. A communication application may refer to an application/app on the mobile device that controls and/or has control access to one or more communication functionalities of the mobile device. The communication application may enable and/or use the communication functionalities of the mobile device to provide information to the passenger and/or receive and transmit passenger responses/feedback. For example, the communication application may include a ride-share app used by the passenger to call for a ride in the vehicle. During the ride, the passenger may have turned off the screen of the mobile device or may be using another application on the mobile device. Running or switching to the communication application on the mobile device may enable the communication application to use one or more one or more communication functionalities of the mobile device to deliver and/or receive communication to/from the passenger.

The instruction(s) to the passenger may be provided audibly and/or visually provided. For example, the speaker of the vehicle may be used to instruct the passenger to run the communication application on the mobile device, switch to the communication application on the mobile device, and/or interact with the mobile device to enable one or more communication functionalities of the mobile device (e.g., voice message directing the passenger to press a button on the passenger's mobile device to talk to a remote person using the passenger's mobile device). As another example, the display of the vehicle may be used to instruct the passenger to run the communication application on the mobile device, switch to the communication application on the mobile device, and/or interact with the mobile device to enable one or more communication functionalities of the mobile device. As yet another example, a notification may appear on the mobile device to enable one or more communication functionalities of the mobile device (e.g., a message pop-up stating, "Press here to talk to us through your phone.").

In some embodiments, the mobile device engine 114 may facilitate communication with the passenger via the mobile device of the passenger by controlling the mobile device to enable one or more communication functionalities of the mobile device. That is, rather than waiting for the passenger to enable the communication functionalit(ies) of the mobile device, the mobile device engine 114 may directly and/or indirectly control the operation of the mobile device to enable the communication functionalit(ies) of the mobile device. For example, the mobile device engine 114 may control the operation of the mobile device to enable one or more of the microphone functionality, the button functionality, the speaker functionality, and/or the display functionality of the mobile device. As another example, the mobile device engine 114 may control the operation of the mobile device to run or switch to a communication application on the mobile device, with the communication application controlling/having control over one or more of the microphone functionality, the button functionality, the speaker functionality, and/or the display functionality of the mobile device.

In some embodiments, the mobile device engine 114 may facilitate communication with the passenger via the mobile device of the passenger by curtailing operation of one or more communication devices of the vehicle. A communication device of a vehicle may refer to a tool or a device through which communication may be received and/or provided. For example, communication device(s) of a vehicle may include one or more of a microphone, a speaker, and/or a display. Curtailing the operation of a communication device may include directly and/or indirectly controlling the communication device to reduce the extent of operation of the communication device and/or to impose a retraction on the operation of the communication device. For example, curtailing operation of the communication device(s) of the vehicle may include lowering or muting effect of at least one of the communication device(s). For instance, the volume (e.g., operating volume, maximum volume) of a speaker of the vehicle may be lowered and/or the brightness (e.g., operating brightness, maximum brightness) of a display of the vehicle may be dimmed. As another example, curtailing operation of the communication device(s) of the vehicle may include disabling or turning off at least one of the communication device(s). For instance, a speaker of the vehicle may be disabled or may be turned off, and/or a display of the vehicle may be disabled or turned off. For example, the speaker and/or the display of the vehicle may be presenting audio-visual content (e.g., playing a movie) and the mobile device engine 114 may facilitate communication with the passenger via the mobile device of the passenger by muting, pausing, disabling, turning off, and/or otherwise curtailing the presentation of the audio-visual content.

Figure 2:
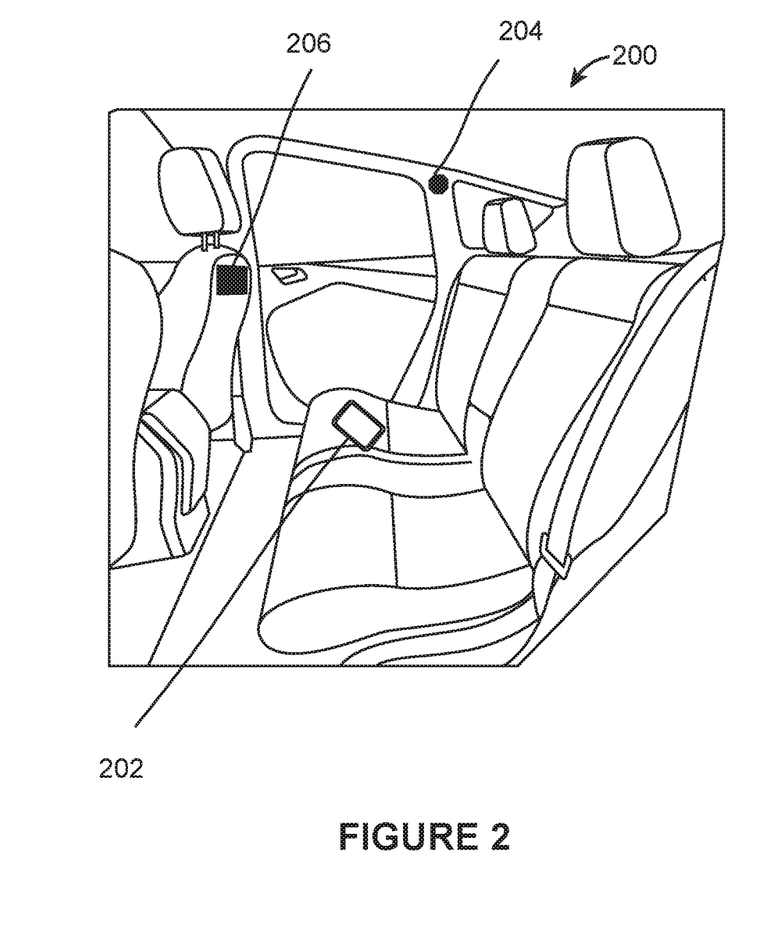
FIG. 2 illustrates an example environment for facilitating communication with a passenger of a vehicle, in accordance with various embodiments.

FIG. 2 illustrates an example environment 200 for facilitating communication with a passenger of a vehicle, in accordance with various embodiments. The environment 200 may include a cabin of a vehicle. A passenger (not shown) may be carrying a mobile device 202. The vehicle may include a speaker 204 and a display 206. The mobile device 202 may be used to communicate with the passenger. The speaker 204 and/or the display 206 may be used or not used to communicate with the passenger.

For example, responsive to a communication event, the communication with the passenger may be facilitated via the mobile device 202. The mobile device 202 may be used to facilitate a two-way communication, where the mobile device 202 is used to deliver communication to the passenger and the mobile device 202 is used to receive and transmit communication from the passenger. For example, a speaker of the mobile device 202 may be used to audibly provide information to the passenger and/or a display of the mobile device 202 may be used to visually provide information to the passenger, while a microphone of the mobile device 202 may be used to record voice of the passenger and/or a button or a touchscreen display of the mobile device 202 may be used to record the passenger's interaction with the mobile device 202, which may form the passenger's communication. For instance, the passenger may hear the voice of a remote person through a speaker of the mobile device 202 and/or see a message from the remote from on the display of the mobile device 202, and respond by speaking into the microphone of the mobile device 202 and/or providing feedback by using a button or a touchscreen display of the mobile device 202.

The mobile device 202 may be used to facilitate a one-way communication, where the speaker 204 and/or the display 206 are used to deliver communication to the passenger and the mobile device 202 is used to receive and transmit communication from the passenger. For example, the speaker 204 of the vehicle may be used to audibly provide information to the passenger and/or the display 206 of the vehicle may be used to visually provide information to the passenger, while a microphone of the mobile device 202 may be used to record voice of the passenger and/or a button or a touchscreen display of the mobile device 202 may be used to record the passenger's interaction with the mobile device 202, which may form the passenger's communication. For instance, the passenger may hear the voice of a remote person through the speaker 204 of the vehicle and/or see a message from the remote from on the display 206 of the vehicle, and respond by speaking into the microphone of the mobile device 202 and/or providing feedback by using a button or a touchscreen display of the mobile device 202.

The operation of the speaker 204 and/or the display 206 may be curtailed during the communication with the passenger. For example, the volume (e.g., operating volume, maximum volume) of the speaker 204 of the vehicle may be lowered and/or the brightness (e.g., operating brightness, maximum brightness) of the display 206 of the vehicle may be dimmed. As another example, the speaker 204 of the vehicle may be disabled or may be turned off, and/or the display 206 of the vehicle may be disabled or turned off during the communication with the passenger via the mobile device 202. Other operations of the mobile device 202, the speaker 204, and the display 306 to facilitate communication with passenger of the vehicle are contemplated.

Figure 3:
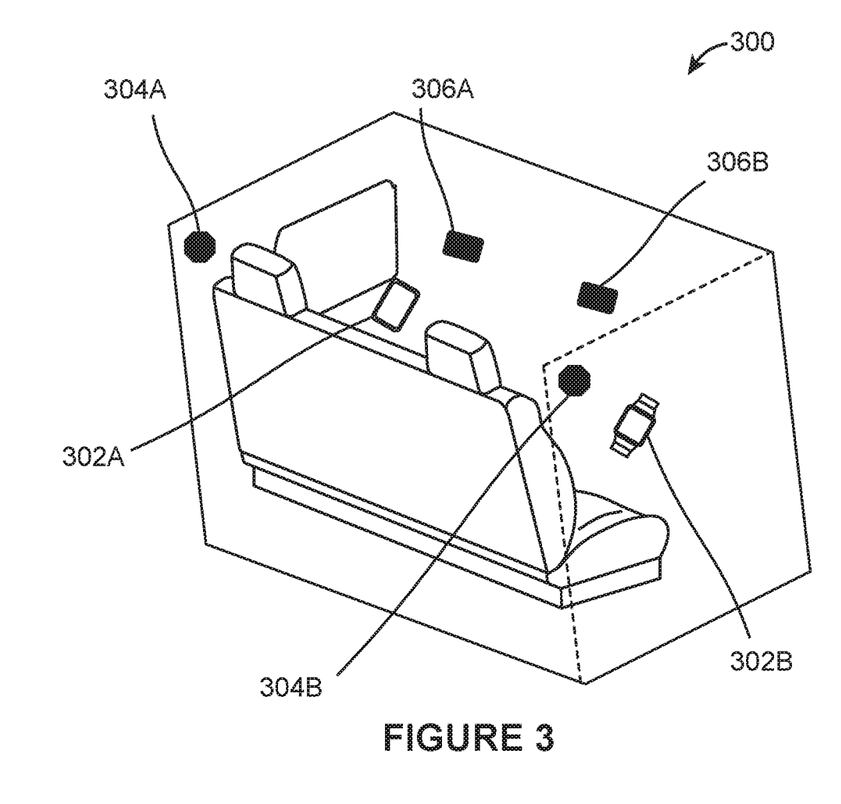
FIG. 3 illustrates an example environment for facilitating communication with a passenger of a vehicle, in accordance with various embodiments.

FIG. 3 illustrates an example environment 300 for facilitating communication with a passenger of a vehicle, in accordance with various embodiments. The environment 300 may include a cabin of a vehicle. Two passengers (not shown) may be carrying mobile devices 302A, 302B. The mobile device 302A may be carried by a passenger on the left side of the vehicle and the mobile device 302B may be carried by a passenger on the right side of the vehicle. The vehicle may include speakers 304A, 304B and displays 306A, 306B. The mobile devices 302A, 302B may be used to communicate with the passengers. The speakers 304A, 304B and/or the displays 306A, 306B may be used or not used to communicate with the passenger.

For example, responsive to a communication event, the communication with the passengers may be facilitated via one or more of the mobile devices 302A, 302B. The mobile devices 302A, 302B may be used to facilitate a two-way communication, where the mobile devices 302A, 302B are used to deliver communication to the passengers and the mobile devices 302A, 302B are used to receive and transmit communication from the passengers. The mobile devices 302A, 302B may be used to facilitate a one-way communication, where the speakers 304A, 304B and/or the displays 306A, 306B is used to deliver communication to the passengers and the mobile devices 302A, 302B are used to receive and transmit communication from the passengers.

The operation of the mobile devices 302A, 302B, the speakers 304A, 304B, and/or the displays 306A, 306B may change depending on whether the communication is with one or both of the passengers. For example, based on the communication being with both passengers, both mobile devices 302A, 302B, both speakers 304A, 304B, and/or both displays 306A, 306B may be used to provide communication to the passengers and/or receive communication from the passengers. As another example, based on the communication being with the passenger on the right, the mobile device 302B, the speaker 304B, and/or the display 306B may be used to provide communication to the passenger on the right and/or receive communication from the passenger on the right. The mobile device 302A, the speaker 304A, and/or the display 306A may not be used to facilitate communication with the passenger on the right.

The operation of the speakers 304A, 304B and/or the displays 306A, 306B may be curtailed during the communication with the passenger(s). For example, based on communication with both passengers, the volume (e.g., operating volume, maximum volume) of both speakers 304A, 304B of the vehicle may be lowered and/or the brightness (e.g., operating brightness, maximum brightness) of both displays 306A, 306B of the vehicle may be dimmed. As another example, both speakers 304A, 304B of the vehicle may be disabled or may be turned off, and/or both displays 306A, 306B of the vehicle may be disabled or turned off during the communication with the passengers via the mobile devices 302A, 302B. As another example, based on communication with the passenger on the right, the volume (e.g., operating volume, maximum volume) of the speaker 304B of the vehicle may be lowered and/or the brightness (e.g., operating brightness, maximum brightness) of the display 306B of the vehicle may be dimmed. As another example, the speaker 304B of the vehicle may be disabled or may be turned off, and/or the display 306B of the vehicle may be disabled or turned off during the communication with the passenger on the right via the mobile device 302B. The operation of the speaker 304A and/or the display 306A may not be impacted or may be impacted less based on the communication with the passenger on the right. For example, the operation of the speaker 304A and/or the display 306A may not change due to the communication with the passenger on the right or the volume/brightness of the speaker 304A/the display 306A may not be lowered as much as the volume/brightness of the speaker 304B/the display 306B. Other operations of the mobile devices 302A, 302B, the speakers 304A, 304B, and the displays 306A, 306B to facilitate communication with passengers of the vehicle are contemplated.

Figure 4:
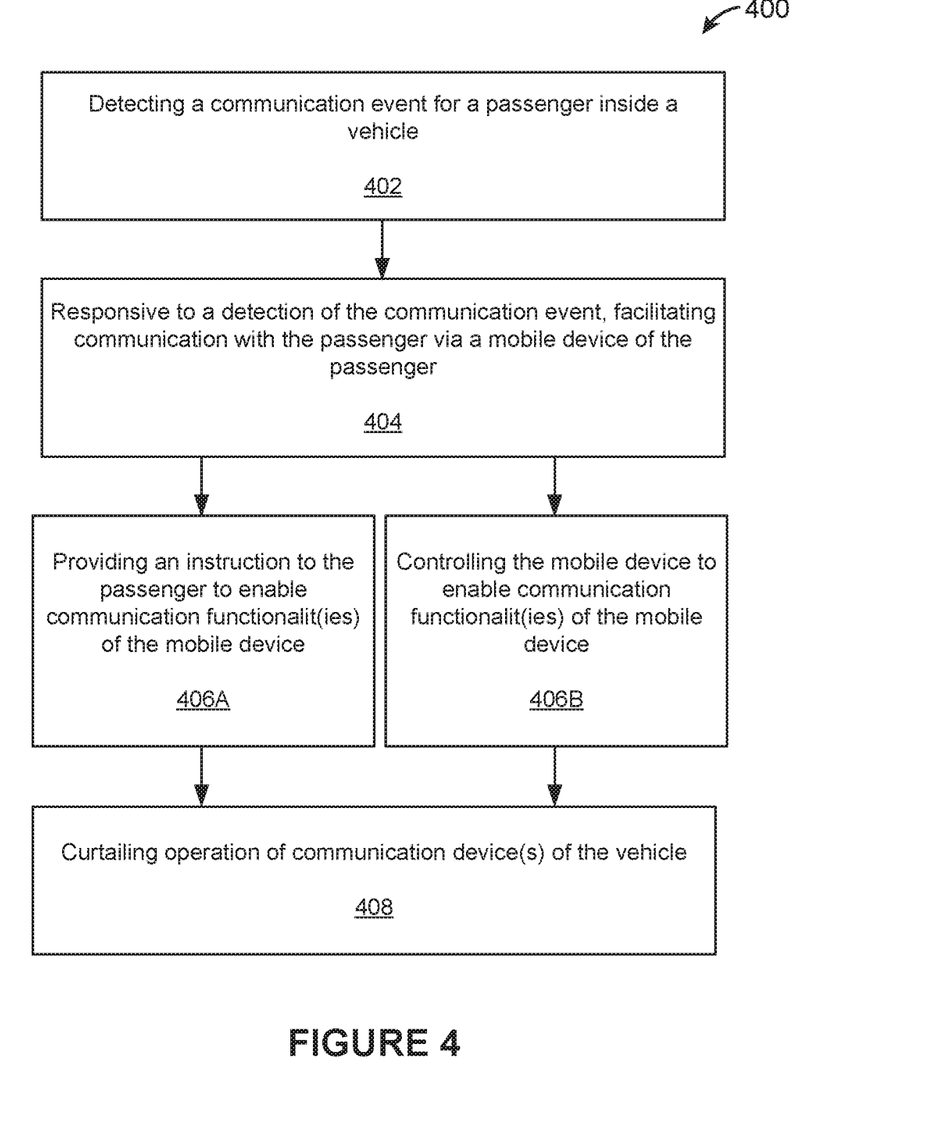
FIG. 4 illustrates a flowchart of an example method, in accordance with various embodiments.

FIG. 4 illustrates a flowchart of an example method 400, according to various embodiments of the present disclosure. The method 400 may be implemented in various environments including, for example, the environment 100 of FIG. 1. The operations of method 400 presented below are intended to be illustrative. Depending on the implementation, the example method 400 may include additional, fewer, or alternative steps performed in various orders or in parallel. The example method 400 may be implemented in various computing systems or devices including one or more processors.

At block 402, a communication event for a passenger inside a vehicle may be detected. At block 404, responsive to a detection of the communication event, communication with the passenger may be facilitated via a mobile device of the passenger. At block 406A, an instruction may be provided to the passenger to enable one or more communication functionalities of the mobile device. At block 406B, the mobile device may be controlled to enable one or more communication functionalities of the mobile device. At block 408, operation of one or more communication devices of the vehicle may be curtailed.

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 5:
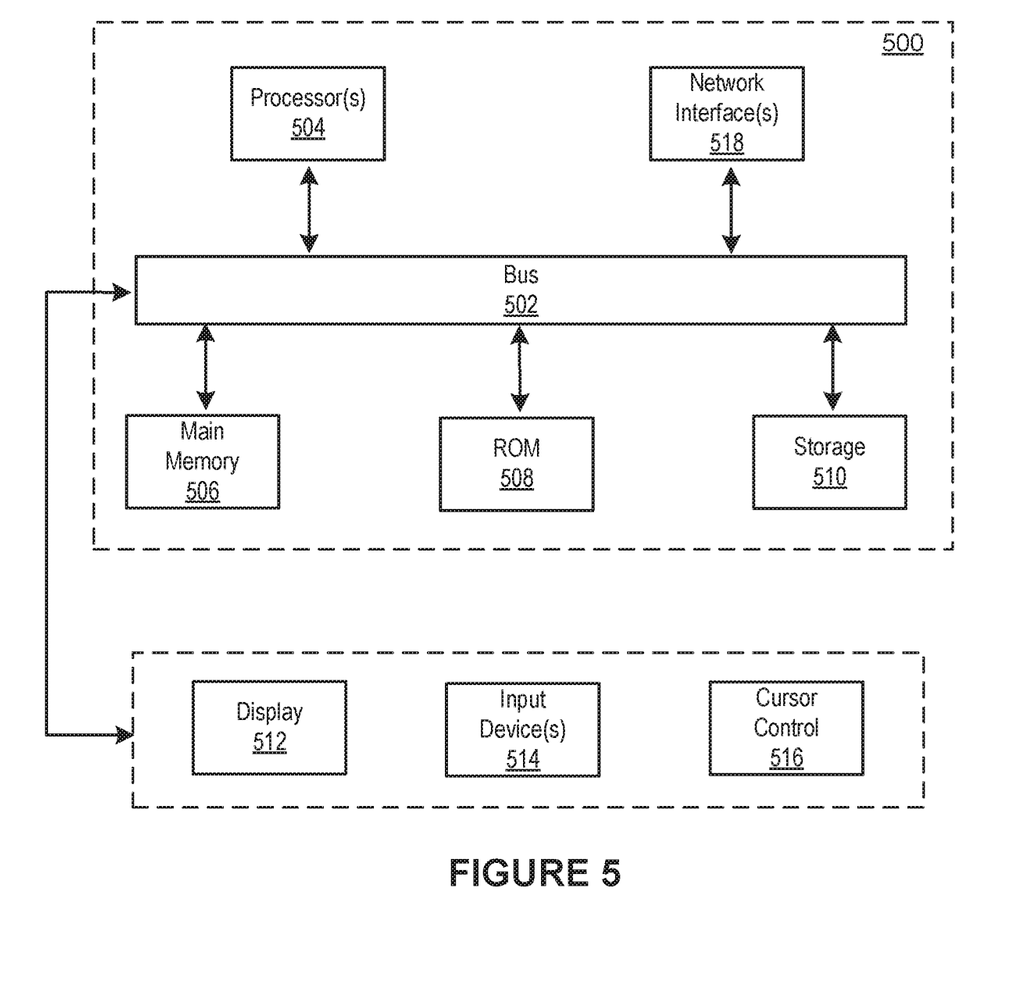
FIG. 5 illustrates a block diagram of an example computer system in which any of the embodiments described herein may be implemented.

FIG. 5 is a block diagram that illustrates a computer system 500 upon which any of the embodiments described herein may be implemented. The computer system 500 includes a bus 502 or other communication mechanism for communicating information, one or more hardware processors 504 coupled with bus 502 for processing information. Hardware processor(s) 504 may be, for example, one or more general purpose microprocessors.

The computer system 500 also includes a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

The computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions.

The computer system 500 may be coupled via bus 502 to a display 512, such as a cathode ray tube (CRT) or LCD display (or touch screen), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 500 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more instructions contained in main memory 506. Such instructions may be read into main memory 506 from another storage medium, such as storage device 510. Execution of the sequences of instructions contained in main memory 506 causes processor(s) 504 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may retrieves and executes the instructions. The instructions received by main memory 506 may optionally be stored on storage device 510 either before or after execution by processor 504.

The computer system 500 also includes a communication interface 518 coupled to bus 502. Communication interface 518 provides a two-way data communication coupling to one or more network links that are connected to one or more local networks. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN (or WAN component to communicated with a WAN). Wireless links may also be implemented. In any such implementation, communication interface 518 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 518, which carry the digital data to and from computer system 500, are example forms of transmission media.

The computer system 500 can send messages and receive data, including program code, through the network(s), network link and communication interface 518. In the Internet example, a server might transmit a requested code for an application program through the Internet, the ISP, the local network and the communication interface 518.

The received code may be executed by processor 504 as it is received, and/or stored in storage device 510, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

The data stores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A system comprising:
   one or more processors; and
   a memory storing instructions that, when executed by the one or more processors, cause the system to perform operations comprising:
      detecting a communication event for a passenger inside a vehicle; and
      responsive to detection of the communication event, facilitating communication with the passenger via a mobile device of the passenger, wherein facilitating communication with the passenger via the mobile device of the passenger includes providing, via an output functionality of the vehicle, an instruction to the passenger to launch an application on the mobile device that has access to and that enables one or more communication functionalities of the mobile device,
      wherein the one or more communication functionalities comprises a button functionality enabled by one or more physical or virtual buttons of the mobile device, and
      wherein the mobile device is configured to associate a respective response with each of the one or more buttons to a question presented to the passenger via the output functionality of the vehicle or an output functionality of the mobile device.

2. The system of claim 1, wherein the one or more communication functionalities of the mobile device further includes one or more of a microphone functionality, a speaker functionality, or a display functionality.

3. The system of claim 1, wherein the application is a first application, and wherein the instruction instructs the passenger to switch from a second application currently executing on the mobile device to the first application.

4. The system of claim 1, wherein facilitating communication with the passenger via the mobile device of the passenger includes remotely controlling the mobile device to enable one or more communication functionalities of the mobile device.

5. The system of claim 1, wherein facilitating communication with the passenger via the mobile device of the passenger includes curtailing operation of one or more communication devices of the vehicle.

6. The system of claim 5, wherein the one or more communication devices of the vehicle include one or more of a microphone, a speaker, or a display.

7. The system of claim 5, wherein curtailing operation of the one or more communication devices of the vehicle includes at least one of lowering a volume of at least one of one or more communication devices, muting the at least one of the one or more communication devices, or turning off the at least one of the one or more communication devices.

8. The system of claim 1, wherein the vehicle is an autonomous vehicle.

9. A method implemented by a computing system including one or more processors and storage media storing machine-readable instructions, wherein the method is performed using the one or more processors, the method comprising:
   detecting a communication event for a passenger inside a vehicle; and
   responsive to detection of the communication event, facilitating communication with the passenger via a mobile device of the passenger, wherein facilitating communication with the passenger via the mobile device of the passenger includes providing, via an output functionality of the vehicle, an instruction to the passenger to launch an application on the mobile device that has access to and that enables one or more communication functionalities of the mobile device,
   wherein the one or more communication functionalities comprises a button functionality enabled by one or more physical or virtual buttons of the mobile device, and
   wherein the mobile device is configured to associate a respective response with each of the one or more buttons to a question presented to the passenger via the output functionality of the vehicle or an output functionality of the mobile device.

10. The method of claim 9, wherein the one or more communication functionalities of the mobile device further includes one or more of a microphone functionality, a speaker functionality, or a display functionality.

11. The method of claim 9, wherein the application is a first application, and wherein the instruction instructs the passenger to switch from a second application currently executing on the mobile device to the first application.

12. The method of claim 9, wherein facilitating communication with the passenger via the mobile device of the passenger includes remotely controlling the mobile device to enable one or more communication functionalities of the mobile device.

13. The method of claim 9, wherein facilitating communication with the passenger via the mobile device of the passenger includes curtailing operation of one or more communication devices of the vehicle.

14. The method of claim 13, wherein the one or more communication devices of the vehicle include one or more of a microphone, a speaker, or a display.

15. The method of claim 13, wherein curtailing operation of the one or more communication devices of the vehicle includes at least one of lowering a volume of at least one of one or more communication devices, muting the at least one of the one or more communication devices, or turning off the at least one of the one or more communication devices.

16. The method of claim 9, wherein the vehicle is an autonomous vehicle.

17. A non-transitory computer readable medium comprising instructions that, when executed, cause one or more processors to perform:
 detecting a communication event for a passenger inside a vehicle; and
 responsive to detection of the communication event, facilitating communication with the passenger via a mobile device of the passenger, wherein facilitating communication with the passenger via the mobile device of the passenger includes providing, via an output functionality of the vehicle, an instruction to the passenger to launch an application on the mobile device that has access to and that enables one or more communication functionalities of the mobile device,
wherein the one or more communication functionalities comprises a button functionality enabled by one or more physical or virtual buttons of the mobile device, and
wherein the mobile device is configured to associate a respective response with each of the one or more buttons to a question presented to the passenger via the output functionality of the vehicle or an output functionality of the mobile device.

\* \* \* \* \*